Figure 8:
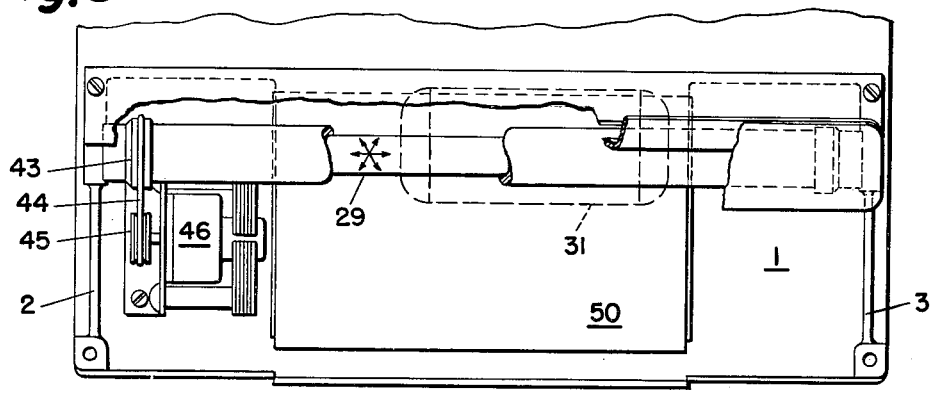

Aug. 15, 1961 B. J. TAMARIN 2,995,981
APPARATUS FOR DISPLAYING VECTOGRAPHIC PRINTS
Filed March 24, 1954 7 Sheets-Sheet 1
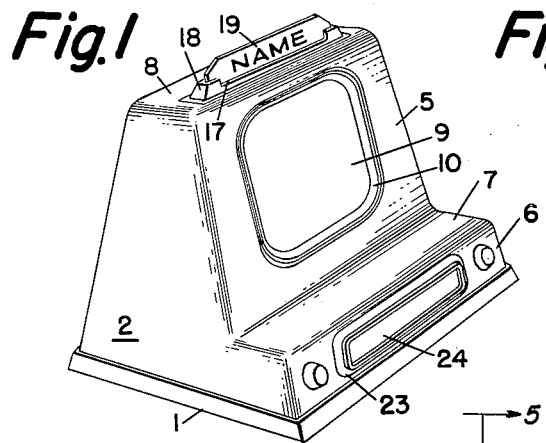
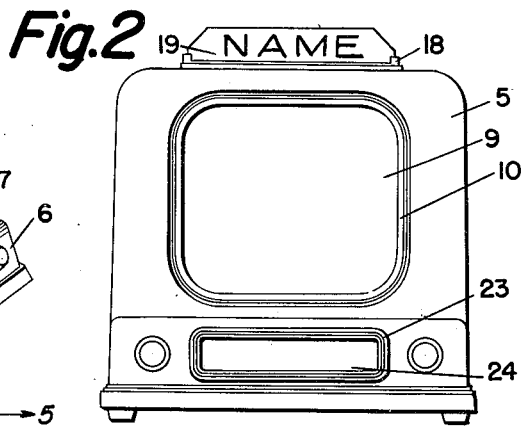
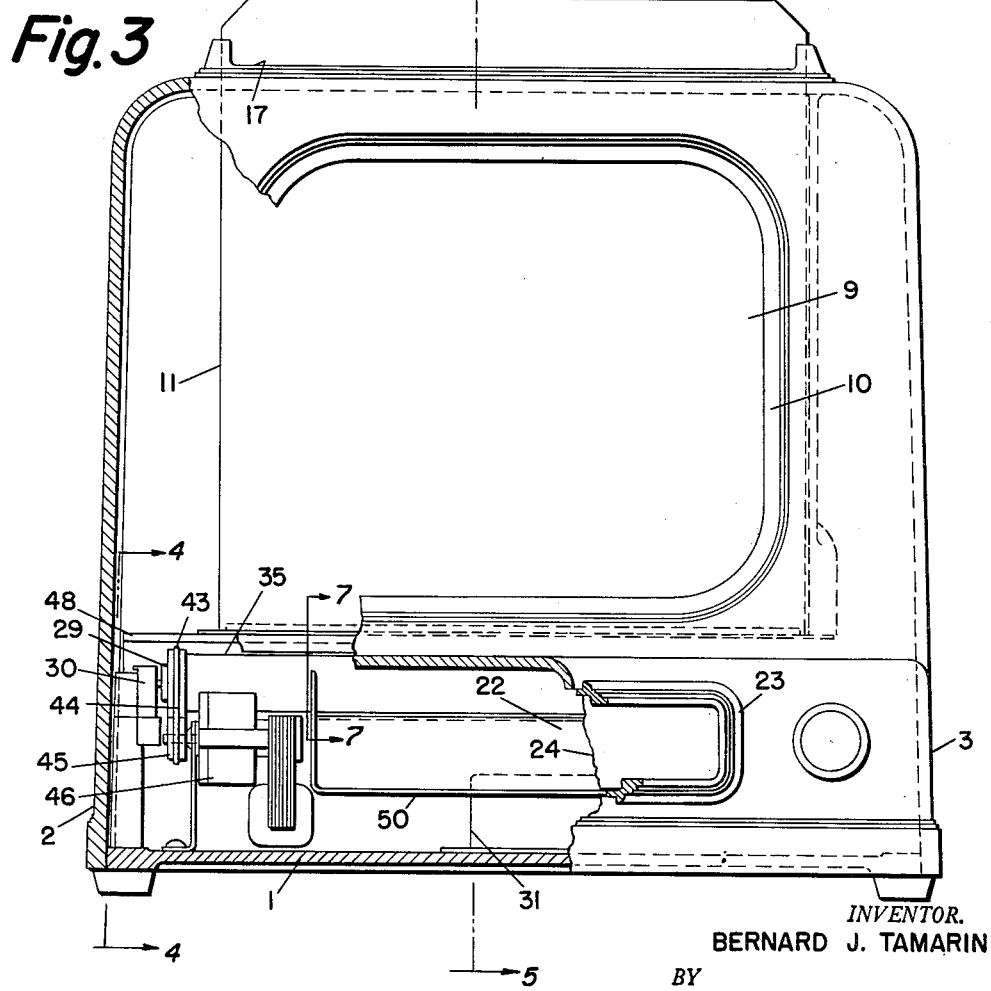
INVENTOR.
BERNARD J. TAMARIN
BY
ATTORNEYS Aug. 15, 1961     B. J. TAMARIN     2,995,981
APPARATUS FOR DISPLAYING VECTOGRAPHIC PRINTS
Filed March 24, 1954     7 Sheets-Sheet 2
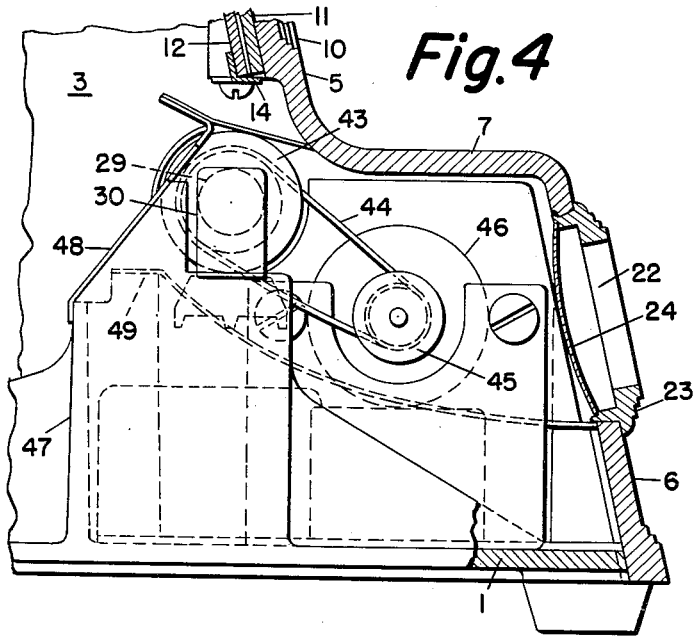
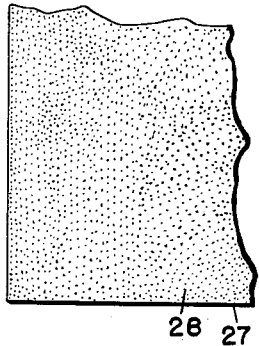
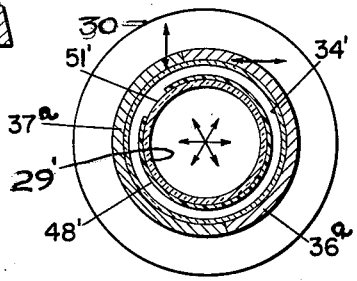
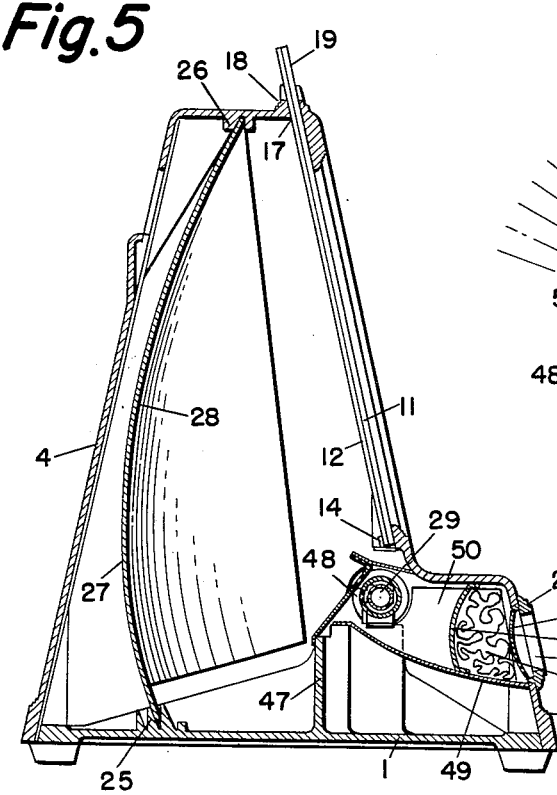
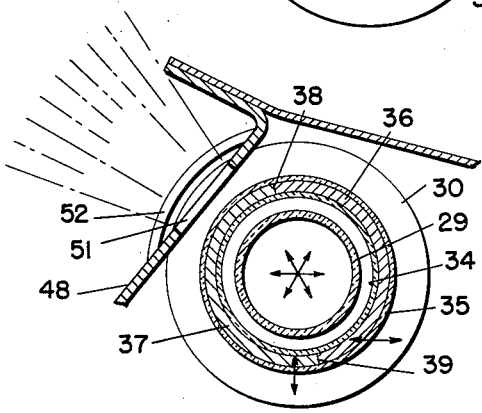
INVENTOR.
BERNARD J. TAMARIN
BY
ATTORNEYS Aug. 15, 1961  B. J. TAMARIN  2,995,981
APPARATUS FOR DISPLAYING VECTOGRAPHIC PRINTS
Filed March 24, 1954  7 Sheets-Sheet 3

INVENTOR.
BERNARD J. TAMARIN
BY
ATTORNEYS

Aug. 15, 1961
B. J. TAMARIN
2,995,981
APPARATUS FOR DISPLAYING VECTOGRAPHIC PRINTS
Filed March 24, 1954
7 Sheets-Sheet 4
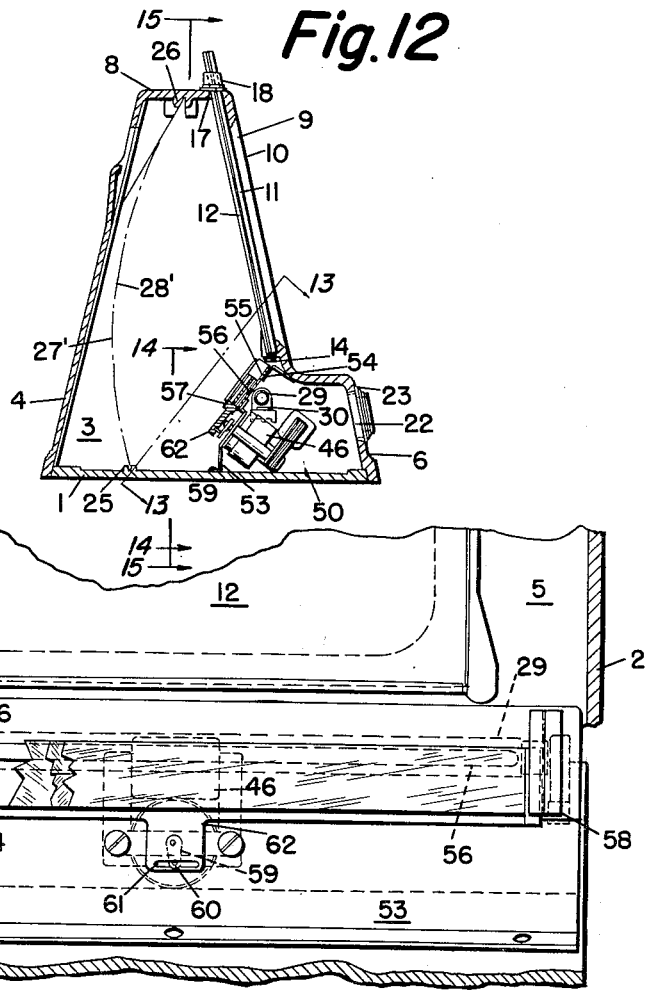
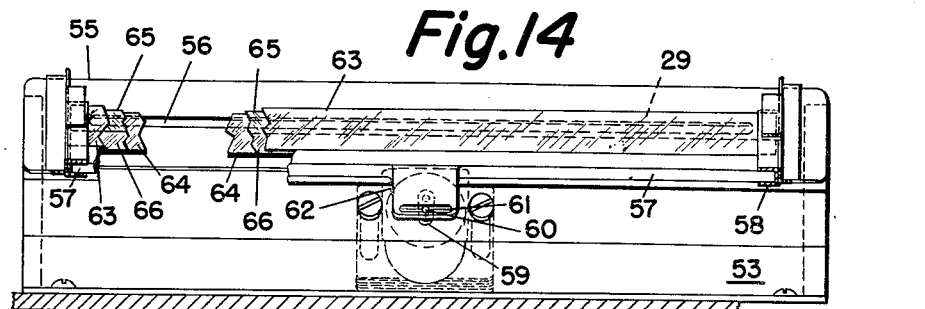
INVENTOR.
BERNARD J. TAMARIN
BY
ATTORNEYS Aug. 15, 1961  B. J. TAMARIN  2,995,981
APPARATUS FOR DISPLAYING VECTOGRAPHIC PRINTS
Filed March 24, 1954  7 Sheets-Sheet 5

INVENTOR.
BERNARD J. TAMARIN
BY
ATTORNEYS

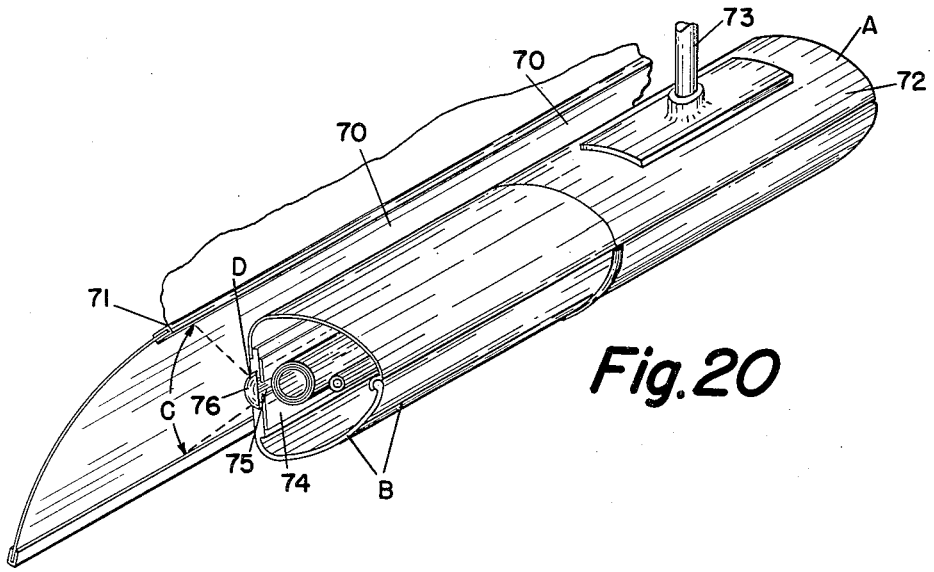
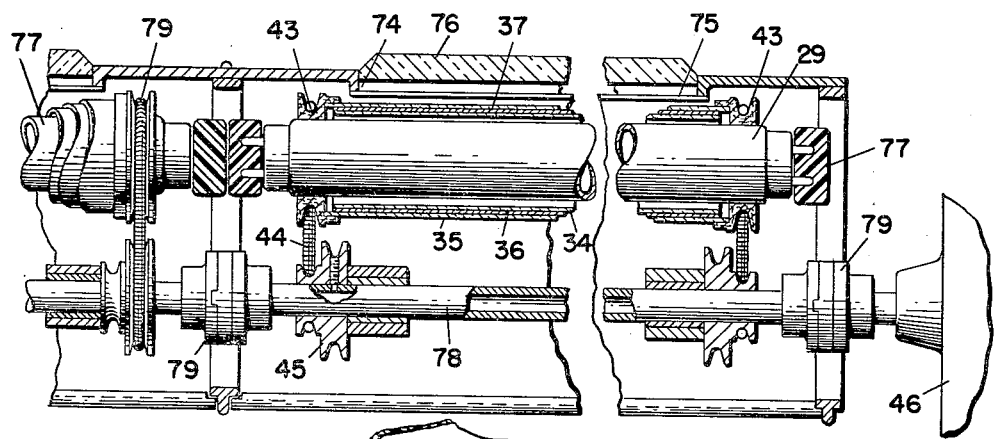
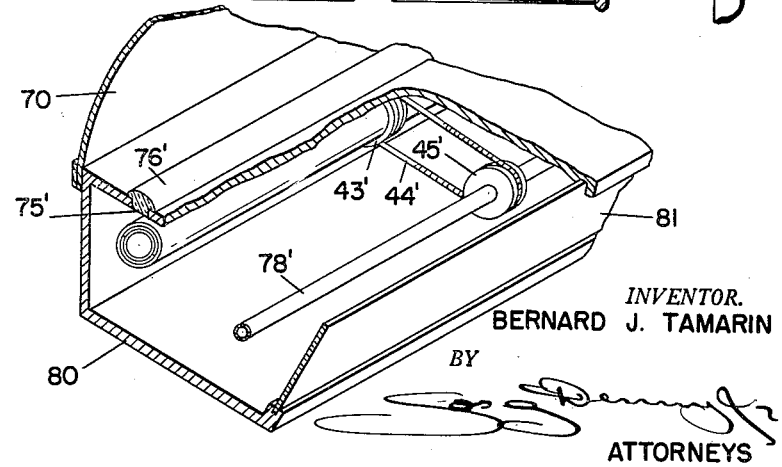

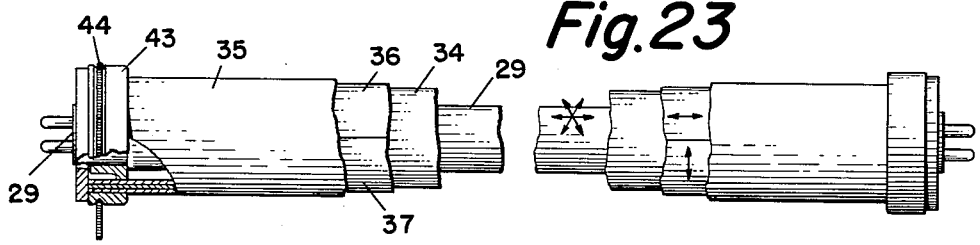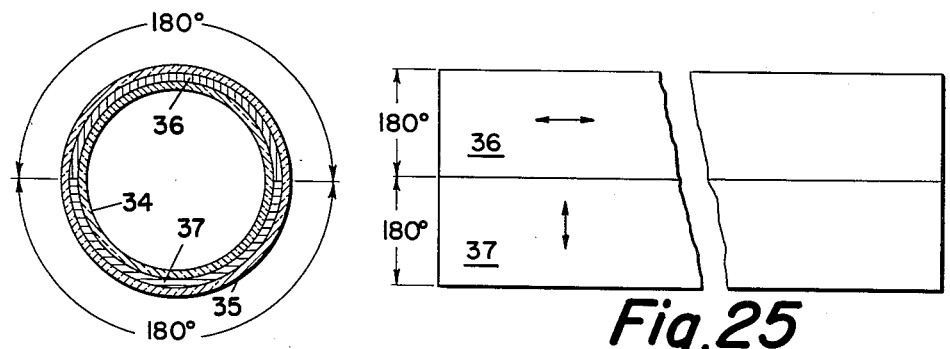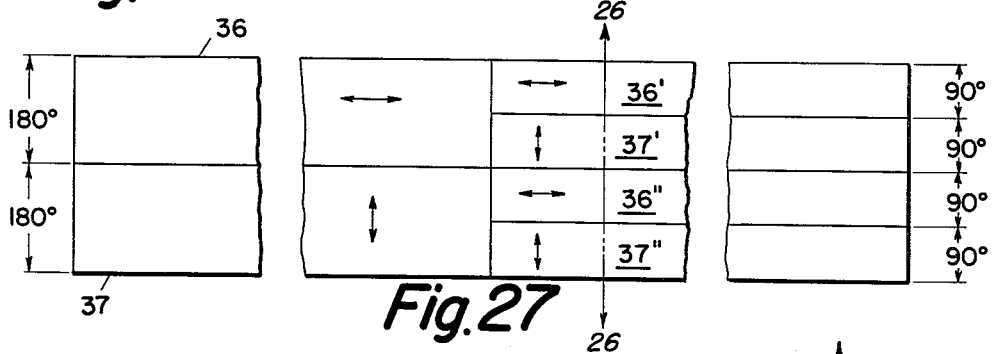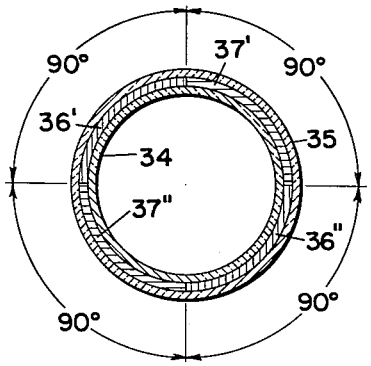

2,995,981
**APPARATUS FOR DISPLAYING
VECTOGRAPHIC PRINTS**
Bernard J. Tamarin, W. Valley Green Road and
Hunt Lane, Flourtown, Pa.
Filed Mar. 24, 1954, Ser. No. 418,423
4 Claims. (Cl. 88—65)

My invention is an improved apparatus for displaying complementary images formed in a polarized light analyser and imparting an effect of motion without the use of polarizing spectacles by the viewer.

In its preferred form, my invention contemplates the display, in rapid alternation, of partly superimposed images formed respectively by contrast which is a function of the direction of vibration of polarized light traversing the surface or body in which the image is formed. Such images, or parts thereof, are preferably so related as to represent different stages of an action.

In accordance with my invention an analyser having areas respectively penetrable by light polarized about transverse axes, viz. vibrating in transverse directions, is illuminated by a light beam polarized, at rapid intervals, about transverse axes and complementary respectively to the respective areas of the analyser, the interval during which the analyser is illuminated only by light of each polarity being substantially longer than an intervening interval during which the analyser is illuminated by light having component beams vibrating in opposite directions. The illuminating rays may initially emanate from a source of unpolarized light and is then, wholly or partly, formed into a wide, thin beam by optical or physical means, so that the emergent beam is bounded by at least two substantially parallel lines which are preferably of substantially greater length than the distance between them.

The light entering or leaving the optical or physical means for forming such wide, thin beam is intercepted, in rapid alternation, by polarizing elements having light polarizing axes transverse to one another, so that the polarity of the light beam is rapidly alternated and the polarizing elements act as a compound shutter to alternately cut off light vibrating in one or the other of transverse planes. The polarities imparted to the beam by such polarizing elements is preferably reversed by an aspecular reflector before or after passage of the polarized light through the analyser.

The alternate polarization of the light beam so that it vibrates in opposite directions is preferably effected by the rotation or oscillation of a polarizer having polarizing elements of transverse polarity abutting along parallel axial lines and rotating or oscillating about the source of unpolarized light. The light may be caused to vibrate alternately in transverse directions by passage through a reciprocating shutter having polarizing sections imparting transverse polarity sequentially to the light beam; such sections abutting along line normal to the direction of reciprocation. With such arrangements of polarizer elements, light of mixed polarity reaches the analyser only for very brief periods at relatively long intervals and the images appear clear and sharp when illuminated for longer periods by polarized light complementary to the respective analysers.

The polarity of the light beam may be alternated at different rates across the width of the beam by subdividing portions of one or more elements of the polarizer. Portions of the analyser images illuminated by light passing through subdivisions of the polarizer elements give the effect of more rapid motion than portions of the analyser images illuminated by light polarized by elements which are not subdivided.

My invention is particularly adapted for use in display signs such as those used on counters and in vehicles, with the images partly overlapped but representing different but closely associated stages of an action, so as to give an effect of animation simulating television or motion pictures, as the respective images are alternately illuminated.

If desired, portions of the polarized light which is not required for illuminating the analyser may be directed through crushed, birefringent material, such as thin sheeted cellulose acetate (cellophane) so as to form a scintillating border along or around the analyser images.

The image-bearing analyser may be made in any desired manner which will produce one or more areas whose optical density is a function of the direction of vibration of light incident thereon. Preferably, however, such image-bearing analysers are of the type known as vectographs.

The making of vectographs of various types is described in United States Letters Patents Nos. 2,440,125, 2,440,105, 2,423,504, 2,373,035, 2,329,543, 2,315,373, 2,289,715, 2,204,604, 2,203,687, 2,165,974.

In vectographs made for the practice of the preferred method of my invention, the image made by an analysing area portrays a stage of action so related to the stage of action portrayed by another image (which may or may not be analytical of light) and the stages of action are so coordinated with the intervals between the incidences of complementarily polarized light on the area first referred to, that the resulting continuity of action is consonant with ordinary experience. In other words, the differences in the stages of action represented by the several images is preferably no greater than would normally occur in the interval between the showings of the respective images as clear images.

Preferably, part at least, of each complementary image is analytical of light incident thereon and the axis of the analysing area of one image is preferably at right angles to the axis of the analysing area of the other image. Such stages of action represented by the respective images may be made visible in alternation with such rapidity and with such a time interval of incidence of complementary light only on each analysing image as to give the effect of motion, and the effect of a gradual fading or gradual dissolving of one image and a gradual intensification of the other image may be substantially obviated.

The principles of my invention and the best modes contemplated by me of carrying out the invention will further appear from the following description and the accompanying drawings in illustration thereof.

Figure 9:
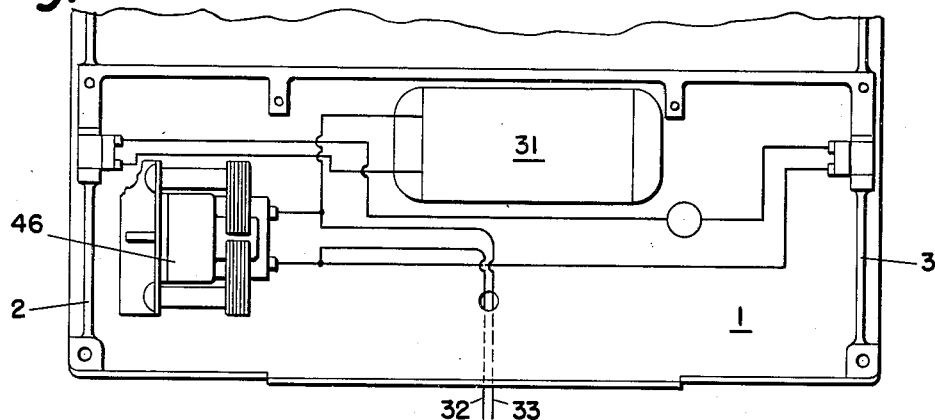
Figure 10:
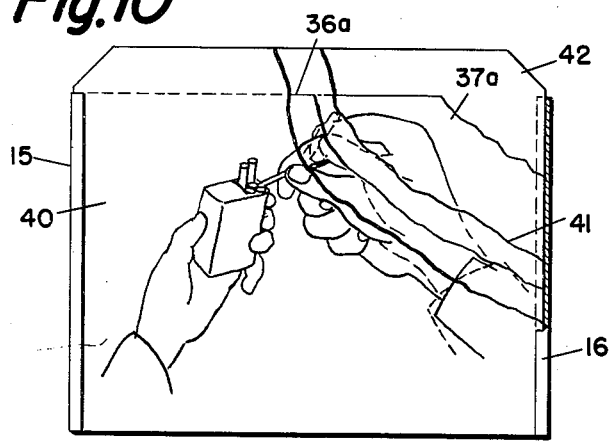
Figure 11:
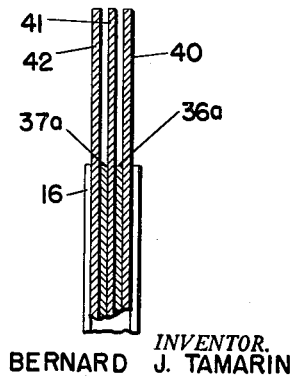
Figure 15:
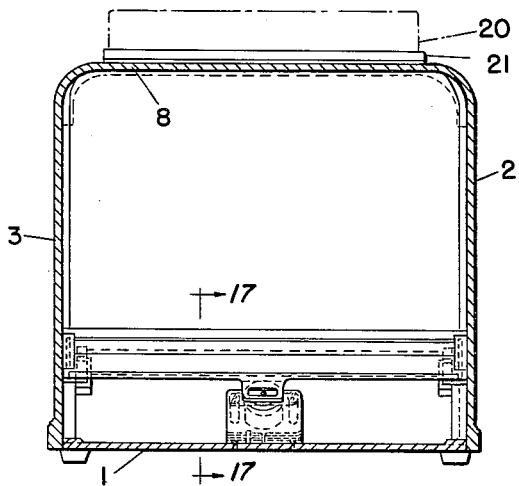
Figure 16:
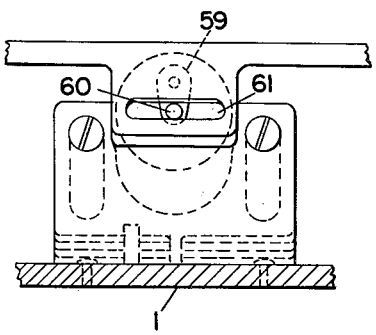
Figure 17:
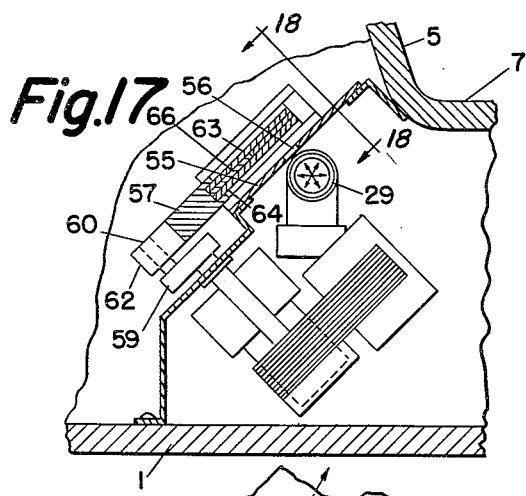
Figure 18:
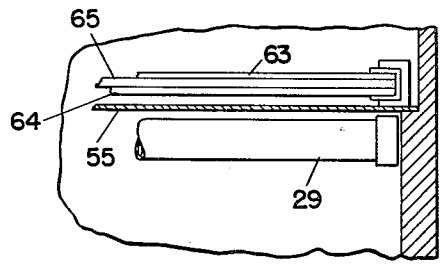
Figure 19:
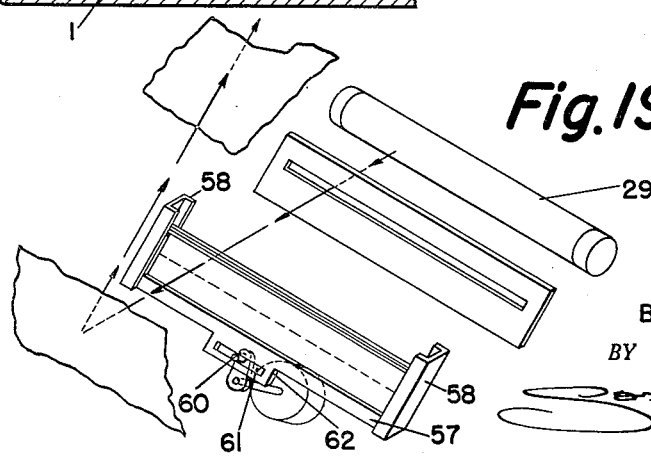

In the drawings FIG. 1 is a perspective view of apparatus embodying my invention and for practicing my method; FIG. 2 is a front elevation of the apparatus shown in FIG. 1; FIG. 3 is an enlarged front elevation of the apparatus shown in FIGS. 1 and 2 with parts broken away to show the interior construction; FIG. 4 is an enlarged, fragmentary, vertical sectional view taken approximately on the line 4—4 of FIG. 3; FIG. 5 is a vertical sectional view taken approximately on the line 5—5 of FIG. 3; FIG. 6 is a fragmentary, diagrammatic view of a light diffuser and disseminator for spreading polarized light over a vectograph; FIG. 7 is an enlarged, fragmentary, sectional view taken on the line 7—7 of FIG. 3; FIG. 8 is a fragmentary plan view of the front portion of the base of the apparatus and of illuminating and driving mechanism thereon, the cover being removed; FIG. 9 is a horizontal view, similar to FIG. 8, with further parts omitted and a wiring scheme shown diagrammatically; FIG. 10 is a front elevation of a vectograph, and its frame, suitable for use in my invention, with parts broken away; FIG. 11 is a fragmentary elevation of the inside of a vertical leg of the vectograph frame shown in FIG. 10, with the vectograph therein sectioned; FIG. 12 is a transverse sectional view of a modified apparatus embodying my invention; FIG. 13 is a fragmentary, sectional view of the modified apparatus shown in FIG. 12, taken in the direction indicated by the section line 13—13 of such figure and with parts broken away; FIG. 14 is a fragmentary sectional view taken in the direction indicated by the section line 14—14 of FIG. 12, with parts broken away; FIG. 15 is a vertiual sectional view taken on the line 15—15 of FIG. 12; FIG. 16 is an enlarged, fragmentary, sectional view of part of the actuating mechanism for the polarizer shown in FIGS. 12-15; FIG. 17 is an enlarged transverse sectional view taken in the direction indicated by the section line 17—17 of FIG. 15; FIG. 18 is an enlarged, fragmentary sectional view taken in the direction indicated by the section line 18—18 of FIG. 17; FIG. 19 is an exploded, diagrammatic view of parts shown in FIGS. 12-18 for effecting polarization, on transverse axis, of a beam of light; FIG. 20 is a fragmentary perspective view illustrating, diagrammatically, a modified embodiment of my invention particularly adapted for vehicular use; FIG. 21 is a fragmentary, horizontal sectional view of part of the apparatus shown in FIG. 20; FIG. 22 is a fragmentary, broken, perspective view of a further modified embodiment of my invention adapted for vehicular use; FIG. 23 is a detached longitudinal sectional view, with parts broken away, of the tubular illuminator and polarizer included in the embodiment of my invention illustrated in FIGS. 1 to 8 and in FIGS. 20 to 22; FIG. 24 is a transverse sectional view of the polarizer tube shown in FIG. 23; FIG. 25 is a diagrammatic, fragmentary, flattened layout of the polarizing elements embodied in the polarizer tube shown in FIGS. 23 and 24; FIG. 26 is a transverse sectional view illustrating the possibility of further circumferential subdivision of polarizer elements at one end of a polarizing tube such as shown in FIGS. 23 and 25; FIG. 27 is a diagrammatic, fragmentary, flattened layout of the polarizing elements shown in FIG. 26; FIG. 28 is a vectograph particularly designed for use in connection with a subdivided polarizer such as illustrated in FIGS. 26 and 27, but which is useable in conjunction with any of the other embodiments of my invention shown in the drawings; and FIG. 29 is a transverse sectional view of a modified illuminating and polarizing assembly having a slotted sleeve on the illuminator to emit only a narrow beam for polarization and which may be substituted for the illuminator and slotformer of the other embodiments of my invention illustrated in the drawings.

In FIGS. 1 to 19 of the drawings, I have shown embodiments of my invention housed in cabinets simulating television cabinets and each comprising a molded casing having a base 1, side walls 2 and 3, an inclined rear wall 4, a front wall comprising offset, inclined panels 5 and 6 connected by a horizontal shelf or table 7, and a top 8.

Each panel 5 contains a viewing aperture 9 surrounded by a molded edge 10 and normally closed by a transparent, rigid sheet 11 and a vectograph print 12 which are supported by a flanged ledge 14 and side slideways 15 and 16 forming a frame fixed to the inside of the panel 5.

The transparent sheet 11 and vectograph 12 may project through a slot 17, surrounded by a molding 18, in the top 8 to provide for the display of an unchanging sign element such as a name 19, or as illustrated in FIG. 15, the slot 17 may be omitted and a name plate 20 positioned in a slotted bracket 21 centered upon the top 8.

Each panel 6 may be provided with a viewing aperture 22 surrounded by a molding 23 and closed by a transparent concavo-convexo sheet 24 seated in grooves of the molding 23. The sheet 24 cooperates with a concavo-convexo transparent sheet 24' to form a compartment for holding crumpled birefringent sheet material 24A, such as cellophane, in position to be viewed through the aperture 22 and form a border along the bottom of the vectograph 12.

The base 1 and top 8 are provided with grooved ribs 25 and 26 for supporting an aspecular reflector 27 or 27' whose matte reflecting surface 28 may be curved as a segment of a spheroid, as illustrated in FIG. 5, or whose matte reflecting surface 28' may be curved as a segment of a cylinder as illustrated in FIG. 12.

The members 27 and 27' comprise sheets whose surfaces 28 and 28' are preferably metal or metallized so as to impart thereto a satin or aspecular surface which does not create an image but which diffusely reflects a beam of polarized light without depolarizing the same. The curvatures and textures of the surfaces 28, 28' are such that, when a narrow beam of polarized light strikes any portions of such surfaces, light is reflected, as a result of the fine irregularities and curvature of the surfaces, to other portions of such surfaces and visibly reflected upward from substantially the entire matte surface to back light the vectograph 12 over substantially its entire surface.

A fixed fluorescent tube 29 (FIGS. 23–25) is seated in sockets 30 (FIGS. 4, 12) and connected in any usual manner with a high frequency transformer 31 (FIGS. 8, 9), which is supplied with electric current through conductors 32 and 33 connected with any suitable source of alternating current.

In the embodiment of my invention illustrated in FIGS. 1–11, 23–25, the fluorescent tube 29 has a duplex cylindrical polarizer rotatably sleeved thereon. This polarizer may consist of concentric transparent tubes 34 and 35 with polarizing elements 36 and 37 of transverse polarity between them.

The polarizing elements 36 and 37 may consist of strips of polarizing film, such, for example, as the material sold under the trade-name "Polaroid," or any other means for providing polarizing surfaces. For example, one semi-cylindrical half of the tube 34 may be masked while the other semi-cylindrical half is rubbed in a desired direction to orient the surface molecules thereof and the rubbed surfaces may be coated with a dichroic liquid crystalline solution to form an area having the polarizing characteristics of the element 36. Such polarized area may then be masked, and the other semi-cylindrical half of the tube unmasked and rubbed in a transverse direction to orient the surface molecules transversely to the orientation of the first treated surface, and the second rubbed surface then coated with a dichroic liquid crystalline solution to form an area having the polarizing characteristics of the element 37. The mask is then removed from the initially polarized area.

The analyser or vectograph 12 may be made in any suitable manner known to the art to provide an analysing area forming at least one image when illuminated by polarized light vibrating in a direction complementary to the direction of orientation of such area.

As illustrated in FIG. 10, the vectograph 12 comprises sheets of Polaroid 36a and 37a oriented in transverse directions and forms an analyser with the analysing axis of the sheet 36a at an angle to the analysing axis of the sheet 37a. Preferably the sheet 36a has its molecules, or polarizing crystals embedded therein, oriented to substantial parallelism at a right angle to the direction of orientation of the sheet 36a. Each or either of the sheets 36a and 37a forms a base for the reception of a print, and the photographic contrast of such print is a function of the direction of vibration of light traversing such sheet. The photographic contrast of each print is at a maximum when viewed in light vibrating in a direction such that the photographic contrast of the other print is at a minimum. Either print makes a sharp and brilliant image when the vectograph is illuminated by light vibrating substantially wholly in a direction complementary to the direction of orientation of the area forming such image, and the respective images are of reduced sharpness and brilliancy when the light illuminating the vectograph has the same number of lumens as before but vibrates in transverse directions.

A design forming a part of a composite scene may be formed on each of sheets 36a and 37a by treating the analysing surfaces thereof over predetermined areas so as to destroy or impair to varying degrees the polarizing properties of the respective surfaces, or in the production of polarizing sheets the formation of analysing areas may be controlled by inhibiting the formation of polarizing crystals over predetermined portions of an area to give the desired design. Preferably images of a scene at slightly different stages of action are photographed and complementary analysing sheets are formed from the respective negatives by one of the methods described in U.S. Letters Patent No. 2,315,373. The images of such parts of the scene as are to be continuously shown and remain unchanged throughout a cycle are identical in photographic intensity and absolutely superposed upon one another. Such areas remain unchanged as to intensity and inert as to movement throughout a cycle of the polarizer. The images forming portions of the scene representing sequential steps in the action of the continuity are respectively formed so as to be each responsive to light vibration in one direction only.

The sheets 36a and 37a are preferably protected from defacement by interposing them between transparent sheets 40, 41 and 42, and non-analysing varicolored images, complementary to the prints on the sheets 36a and 37a, may be printed on the transparency 40.

The polarized light reflected from the metallic or metallized surfaces 28, 28' vibrates in a direction transverse to the direction of the vibration of the polarized light incident to such surfaces, hence the analysing areas of the sheet 36a designed to pass light polarized by the polarizer element 36 should be oriented transversely to the orientation of the polarizer element 36. Similarly, the analysing areas of the sheet 37a designed to pass light polarized by the polarizer element 37a should be oriented transversely to the orientation of the polarizer element 37.

The alternation of the polarity of light illuminating the analyser or vectograph 12 may be effected by the movement of the transversely oriented polarizer elements 36, 37 so that first one element and then the other element polarizes all the light incident on the vectograph. Preferably this alternation of polarity of the light is effected by rotating the polarizer assembly 39, 35, 36, 37 around the illuminator 29. Such rotary motion may be imparted by means of a pulley 43 fixed on the tube 35 and connected by a belt 44 with a pulley 45 fixed on the shaft of an electric (preferably synchronous) motor 46 connected with the conductors 32 and 33.

The clarity and sharpness of the respective images shown alternately on the analysers 36a and 37a is secured by limiting the illumination thereof during rather sharply defined alternate periods to polarized light during the respective periods in transverse directions complementary to the orientation of the image forming areas of the analysers 36a, 37a.

The dispersion of light may be controlled by a partition 47 extending longitudinally along the base 1 and supporting a gate 48 and diaphragm 49 to segregate the lamp chamber 50 from the remainder of the space enclosed by the cabinet.

The gate 48 contains an elongated slot 51 of much greater width than height and whose edges are preferably parallel with the longitudinal axis of the illuminator tube 29 and with the horizontal edges of the analyser 12. The width of the slot preferably approximates the width of the analyser and the height of the slot is much less than the circumferential arc covered by either of the polarizer elements 36 or 37. Each line of juncture between the polarizer elements 36 and 37 therefore passes the slot in much less time than it takes for either element 36 or 37 to pass the slot.

The beam emitted from the slot is of much greater width than thickness and it is polarized by the respective elements 36, 37 to vibrate wholly in one direction or the other successively for much longer periods than it is polarized by edge sections of both elements to vibrate in both directions concurrently. During each of these longer periods, the image on one or the other of the analysers is sharply and brightly shown, and during the shorter periods when images on both analysers are shown the respective images are less sharp and bright since each is affected by only a portion of the light passing through the slot though the total lumens of the beam is constant. Preferably the peripheral speed of the polarizer and the height of the slot are so coordinated with the images on the analysers 36a and 37a that the time interval between the showing of the respective images in sharp definition is commensurate with ordinary experience of the time interval elapsing between such stages of an action, and such interval is much shorter than the exposure of each image in sharp definition. The effect of true motion is thereby attainable and gradual dissolving of one image and intensification of the other (and vice versa) throughout substantially the entire cycle is obviated.

When employing the vectograph shown in FIG. 10, the hand holding the package of cigarettes and the package per se will be continuously visibly displayed throughout a complete cycle of the polarizer. The hand connected with the package by tape will be displayed only when the vectograph is illuminated by polarized light having a direction of vibration such that it will pass through the oriented area of the analyser 36a having therein the image of such hand and tape. The partially ejected cigarettes and the hand remote from the package will be visibly displaced only when the vectograph is illuminated by polarized light having a direction of vibration complementary to the orientation of the area of the analyser 37a on which such ejected cigarettes and the remote hand are formed. The change from illumination by light vibrating wholly in one direction to illumination by light vibrating wholly in a transverse direction is more rapid than the reaction of the human eye and the persistence in vision of an observer leads him to believe that he sees cigarettes being partially ejected from a package by pulling on a tape.

Polarized light emitted from the polarizer and not passing through the slot may be used to illuminate the birefringent material 24A to form a border along the base of the vectograph and to attract attention to a product name displayed on or through the transparent sheet 24.

In the embodiment of my invention illustrated in FIGS. 12–19, partitions 53 and 54 and the gate 55 separate the lamp and motor chamber 50 from the remainder of the space within the cabinet. The gate 55 contains a light slot 56 extending across the width of the vectograph 12 and of much greater width than height.

A shutter frame 57 is reciprocal in guides 58 by a crank 59 fixed to and rotatable by the shaft of the synchronous motor 46 and having a pin 60 movable in a slot 61 of the frame bracket 62.

The shutter frame 57 has fixed therein a pair of rigid, transparent strips 63 and 64, suitably of glass or plastic, and these strips have sandwiched between them a pair of polarizing elements 65 and 66 preferably made of strips of Polaroid oriented in directions at right angles to one another. The elements 65 and 66 may be otherwise oriented as indicated in connection with the polarizer elements 36, 37.

The longitudinal edges of the polarizing strips 65 and 66 abut against one another to form a close joint 67 which is reciprocable across the slot 56 so that light transmitted through the slot 56 is polarized by one or other of the elements 65, 66 for periods each of which is much longer than the interval during which light transmitted through the slot 56 is polarized by both elements 65 and 66.

When the tube 29 is illuminated by means of high frequency current supplied through the transformer 31, and the frame 57 is reciprocated in its slides by the action of the motor 46, light is emitted from the slot 56 as a thin, wide beam which is alternately polarized by the elements 65, 66. The period during which the beam is caused by the elements 65, 66 to vibrate in both directions is too brief to have an appreciable effect on the visible perception of the viewer of the sharp images shown when the beam is polarized by either the element 65 or 66. The polarized beam strikes the aspecular surface 28' and is diffused over the surface thereof and backlights the vectograph 12. The vectograph acts as an analyser and exhibits in alternation the images, or parts thereof, whose contrast is a function of the direction of vibration of the polarized light incident thereto.

In FIGS. 20 and 21, I have shown a modified apparatus particularly designed to adapt my invention for use in vehicles, such as cars, busses and the like. In this adaptation of my invention, a series of vectographs 70, 70 having metallized backs are mounted in a cornice frame 71 between the roof and side wall of a vehicle, such backs having metallized surfaces contacting the curved rear surfaces of the vectographs.

A hollow elongated housing 72 is suspended in front of the vectographs 70, 70 by hangers 73 and is provided with a gate 74 containing an elongated narrow slot 75. The slot 75 may be covered by a semi-cylindrical lens 76. Fluorescent or cold cathode light tubes 29 have their terminals seated in sockets 77 which are connected with a high frequency transformer 31.

Each tube 29 has loosely sleeved thereon a pair of flanged pulleys 43 which are connected by belts 44 with pulleys 45 fixed to a shaft 78. The shaft 78 is journalled in bearings 79 of the housing 72 and may be rotated by an electric motor 46.

A polarizing tube, similar to that shown in FIGS. 23-25, is seated in flanged ends of the pulleys 43 so as to encircle each tube 29. The semi-cylindrical polarizing elements 36 and 37 are housed between the transparent tubes 34 and 35 and their edges abut to form joints extending lengthwise of the axis of the tube 29.

The width of the slot 75 and the peripheral speed of the polarizer elements 36, 37 are so proportioned that the joints between the transverse polarizing semi-cylinders 36 and 37 pass the slot 75 much more quickly than either semi-cylindrical polarizer elements 36 or 37 passes the slot, so that the light transmitted through each of the polarizing elements 36 and 37 and through the slot 75 and the lens 76 to the vectographs 70 is of much longer duration than the duration of the illumination of the vectographs by light passing concurrently through the polarizers 36 and 37 and through the slot 75 and lens 76 to the vectographs.

The light polarized by the polarizer 36 will bring into view images or portions of images on the vectograph 70 which are otherwise invisible and the light polarized by the polarizer 37 will bring into view on the vectograph 70 images which are otherwise invisible, hence the impression given the viewer will be that of animation or motion of sharply defined images and not the mere dissolving of one picture into another.

Instead of mounting the lighting and polarizing mechanism in a suspended housing as shown in FIGS. 20-21, such mechanism may be mounted in a trough 80 at the base of the cornice frame as shown in FIG. 22. In this embodiment of the invention, light polarized as described in connection with FIGS. 20 and 21 is emitted through an extruded plastic lens 76' seated in the elongated narrow slot 76'. The transparent lens 76' emits a band of polarized light confined within the height of the vectograph 70, and light for illuminating the vehicle may be emitted through the transparent front panel 81 of the trough.

In the embodiments of my invention illustrated in FIGS. 20-22, the wide and thin beam projected against the vectograph is focused upon the entire surface of the vectograph by the curvature thereof, and the metallized backs of the vectographs act as reflectors to improve the illumination.

The illusion of motion may be further intensified by changing the polarity of light illuminating certain oriented areas of a vectograph more rapidly than the changes of polarity of light illuminating other oriented areas of the vectograph. To effect this, the polarizer may be provided at one end thereof with a plurality of elements 36', 37', 36'', 37'' which are successively oriented to cause vibration of light transversely to the vibration caused by an adjacent polarizing element, as shown in FIGS. 26, 27.

The vectograph shown in FIG. 28 may have images of a pair of wings and of a set of ripples formed in an area oriented in one direction and images of the wings and ripples in a second position formed in an area oriented in a direction transverse to the orientation of the first areas. If such a vectograph is placed in the apparatus shown in FIG. 1 and illuminated, in the manner hereinbefore described, by the rotation of a polarizer of the type shown in FIGS. 23-25 the wings will appear to flutter at the same rate as the movements of the ripples. But if a polarizer such as shown in FIGS. 26, 27 be substituted in the apparatus of FIG. 1, the wings will appear to flutter twice as fast as the ripples move.

The polarizer may be further subdivided in similar manner to any extent desired and the height of the slot section complementary thereto proportionately reduced to secure apparent relative motion between images formed on transversely oriented areas and maintain the same relative degree of polarity change through such narrow end of the slot as is achieved through the section of the slot complementary to the polarizer section producing only two polarity changes per revolution.

Instead of having the static portion of the illustration made of exactly superimposed images responsive to polarizing as hereinbefore described, such static portion, may, if desired, be made of a transparency having a non-polarized area bearing image segments complementary to the vectograph areas bearing image segments which are alternately revealed and concealed by light of different polarities to produce the illusion of motion as above described.

As shown in FIG. 29, a fluorescent light tube 29' may be enclosed in an opaque sleeve or cylindrical gate 48' containing a slot 51' through which light to be polarized is emitted as a thin, wide beam. The gate 48' may be formed on the tube 29 by masking the slot area and spraying, dipping or brushing a coating on the remainder of the tube, and then removing the masking tape from the slot area. The combined illuminator 29' and gate or slot former 48' thus formed may be substituted for the tube 29 and slot forming gates 48, 55 or 74. It may be used in conjunction with any of the polarizers previously described but is shown encircled by a rotatable cylindrical polarizer. The polarizer shown comprises a transparent tube 34' with one semi-cylindrical surface rubbed and coated with a dichroic liquid crystalline solution to form a polarizer 36a and with the other semi-cylindrical surface rubbed and coated with a dichroic liquid crystalline solution to form a polarizer 38a oriented transversely to the orientation of the polarizer 36a, as hereinbefore described.

Having described my invention, I claim:

1. A display apparatus comprising an analyser having complementary images including at least in part similar subject matter in different stages of an action, a part of at least one of said images being oriented to pass polarized light vibrating in one direction, means forming a light beam having a section of greater width than thickness and a polarizer having sections oriented in transverse directions, the thickness of said light beam being much less than the breadth of any of said polarizer sections, said sections having a line of juncture between them movable across said light beam to alternate the illumination of said images by light of different polarities.

2. A display apparatus comprising an analyser having areas oriented in transverse directions and forming when illuminated by light of different polarities complementary images including at least in part similar subject matter in different stages of an action, a part of at least one of said images being oriented to pass polarized light vibrating in one direction, a tubular illuminator positioned to illuminate said analyser, means forming a narrow slot controlling the transmission of light in a beam having a section of greater width than thickness between said illuminator and analyser, a polarizer having sections oriented in transverse directions, the thickness of said light beam being much less than the breadth of any of said polarized sections, said sections having a line of juncture beween them movable across said light beam to alternate the illumination of said images by light of different polarities, and means for reciprocating said polarizer across said slot.

3. A display apparatus comprising an analyser having complementary images including at least in part similar subject matter in different stages of an action, a part of at least one of said images being oriented to pass polarized light vibrating in one direction, a source of unpolarized light, means forming a light beam having a section of greater width than thickness and a polarizing shutter having a panel oriented in one direction and a panel oriented in a direction transverse to the orientation of said first panel, the thickness of said light beam being much less than the breadth of any of said polarizer panels, said panels having a line of juncture between them movable across said light beam to alternate the illumination of said images by light of different polarities.

4. A display apparatus as set forth in claim 1 which includes a curved vectograph having a metalized surface contacting one surface thereof, a light source having an axis substantially parallel to the axis of curvature of said vectograph, said polarizer movable in the path of light emitted from said source, and a lens spreading light emanating from said source over said vectograph.

References Cited in the file of this patent

UNITED STATES PATENTS

| | | |
|---|---|---|
| 1,218,082 | Hall | Mar. 6, 1917 |
| 1,219,731 | Hall | Mar. 20, 1917 |
| 1,272,547 | Singer | July 16, 1918 |
| 1,686,615 | Balnokan | Oct. 9, 1928 |
| 2,136,486 | Blondin | Nov. 15, 1938 |
| 2,165,965 | Gaebel et al. | July 11, 1939 |
| 2,165,974 | Land | July 11, 1939 |
| 2,393,969 | Burchell et al. | Feb. 5, 1946 |
| 2,482,410 | Gaetjens | Sept. 20, 1949 |
| 2,535,781 | Burchell | Dec. 26, 1950 |
| 2,565,185 | Pastor | Aug. 21, 1951 |
| 2,688,813 | Hart | Sept. 14, 1954 |
| 2,720,553 | Toulon | Oct. 11, 1955 |

FOREIGN PATENTS

| | | |
|---|---|---|
| 491,097 | Great Britain | Aug. 26, 1938 |